(12) United States Patent
Danielsson (10) Patent No.: US 7,791,033 B2
(45) Date of Patent: Sep. 7, 2010

(54) SYSTEM AND METHOD FOR IMAGING USING RADIO-LABELED SUBSTANCES, ESPECIALLY SUITABLE FOR STUDYING OF BIOLOGICAL PROCESSES

(76) Inventor: Mats Danielsson, Guidgränd 5, Täby (SE) SE-187 44

( * ) Notice: Subject to any disclaimer, the term of this patent is extended or adjusted under 35 U.S.C. 154(b) by 0 days.

(21) Appl. No.: 11/984,541

(22) Filed: Nov. 19, 2007

(65) Prior Publication Data
US 2008/0169421 A1    Jul. 17, 2008

Related U.S. Application Data

(60) Provisional application No. 60/861,980, filed on Dec. 1, 2006.

(51) Int. Cl.
G01T 1/167 (2006.01)
G01T 1/36 (2006.01)
G02B 6/00 (2006.01)

(52) U.S. Cl. .................. 250/370.09; 385/129; 385/131; 359/626; 250/370.01

(58) Field of Classification Search ............ 250/370.09, 250/370.01; 385/129, 131; 359/626
See application file for complete search history.

(56) References Cited

U.S. PATENT DOCUMENTS

| | | | |
|---|---|---|---|
| 3,254,556 A | | 6/1966 | Staunton |
| 4,146,306 A | | 3/1979 | Wallach |
| 4,315,671 A | | 2/1982 | Bunch |
| 4,934,798 A | | 6/1990 | Bunch |
| 5,703,722 A | * | 12/1997 | Blankenbecler ............. 359/653 |
| 5,837,082 A | | 11/1998 | Grafe |
| 6,091,798 A | | 7/2000 | Nygren et al. |
| 6,236,050 B1 | * | 5/2001 | Tumer ................... 250/370.09 |
| 6,259,764 B1 | * | 7/2001 | Evans-Lutterodt et al. .... 378/84 |
| 6,269,145 B1 | | 7/2001 | Piestrup et al. |
| 6,444,994 B1 | | 9/2002 | Ohmori et al. |
| 6,668,040 B2 | * | 12/2003 | Cederstrom ................... 378/84 |
| 6,949,748 B2 | | 9/2005 | Ziock et al. |
| 2002/0148956 A1 | | 10/2002 | Piestrup et al. |
| 2002/0159561 A1 | | 10/2002 | Cederström |
| 2002/0196899 A1 | * | 12/2002 | Karellas ..................... 378/98.8 |
| 2003/0081724 A1 | * | 5/2003 | Piestrup ....................... 378/84 |
| 2004/0174948 A1 | * | 9/2004 | Kojima et al. .................. 378/19 |
| 2004/0251419 A1 | * | 12/2004 | Nelson et al. .......... 250/370.09 |
| 2006/0251215 A1 | * | 11/2006 | Cernik ........................ 378/71 |
| 2006/0256919 A1 | | 11/2006 | Cederstrom |
| 2007/0121784 A1 | | 5/2007 | Cederström et al. |
| 2008/0048102 A1 | * | 2/2008 | Kurtz et al. ................. 250/226 |

OTHER PUBLICATIONS

Campbell, The Science and Engineering of Microelectronic Fabrication, $2^{nd}$ Edition, New York, Oxford University Press, 2001, Table of Contents.

(Continued)

*Primary Examiner*—David P Porta
*Assistant Examiner*—Yara B Green
(74) *Attorney, Agent, or Firm*—Nixon & Vanderhye P.C.

(57) ABSTRACT

An imaging system is based on in-line x-ray optics arranged in combination with an X-ray detector to detect radiation from radio-labeled substances within an object to be imaged. This arrangement will provide a nuclear imaging device with potentially orders of magnitude higher resolution and efficiency and it will moreover be relatively easy to align and to produce and assemble in large quantities.

27 Claims, 9 Drawing Sheets

OTHER PUBLICATIONS

Budinger et al., Imaging Transgenic Animals, Annu. Rev. Biomed. Eng., 1999, 01:611-648.

Lengeler, A microscope for hard x rays based on parabolic compound refractive lenses, Applied Physics Letters, vol. 74, No. 26, Jun. 28, 1999, pp. 3924-3926.

Solomon et al., Applications of Positron Emission Tomography in the development of Molecular Targeted Cancer Therapeutics, Biodrugs 2003: 17(5):339-354.

Batignani et al., Double-sided silicon strip detectors in Pisa, Nuclear Instruments and Methods in Physics Research A 360 (1995) pp. 98-102.

Gambhir et al., Imaging adenoviral-directed reporter gene expression in living animals with positron emission tomography, Proc. Natl. Acad. Sci. USA, vol. 96, pp. Mar. 1999, pp. 2333-2338.

Meikle et al., CoALA-SPECT: A Coded Aperture Laboratory Animal SPECT System for Pre Clinical Imaging, IEEE, 2003, pp. 1061-1065.

Kastis, Compact CT/SPECT Small-Animal Imaging System, IEEE, 2003, pp. 797-801.

Chmeissani et al., First Experimental Tests With a CdTe Photon Counting pixel Detector Hybridized With a Medipix2 Readout Chip, IEEE Transactions on Nuclear Science, vol. 51, No. 5, Oct. 2004, pp. 2379-2385.

King et al., Introduction to the Physics of Molecular Imaging With Radioactive Tracers in Small Animals, Journal of Cellular Biochemistry Supplement 39:221-23 (2002).

Shukla et al., Positron emission tomography: An overview, Journal of Medical Physics, vol. 31, No. 1, 2006, pp. 1-9.

Fowler et al., PET and Drug Research and Development, The Journal of Nuclear Medicine, vol. 40, No. 7, Jul. 1999, pp. 1154-1163.

Beekman, U-SPECT-I: A Novel System for Submillimeter-Resolution Tomography with Radiolabeled Molecules in Mice, The Journal of Nuclear Medicine, vol. 46, No. 7, Jul. 2005, pp. 1194-1200.

Moses, Trends in PET imaging, Nuclear Instruments and Methods in Physical Research A 471 (2001) 209-214.

Mettler, Jr., et al., Essentials of Nuclear Medicine Imaging, Fifth Edition, Saunders Elsevier, 2006, pp. 15-16.

Arnulf Oppult (ed.), Imaging Systems for Medical Diagnostics, Publicis Corporate Publishing, 2005, pp. 508-510.

Campbell, the Table of Contents of The Science and Engineering of Microelectronic Fabrication, Second Edition, Oxford University Press, Feb. 15, 2001.

Bushberg et al., the Table of Contents of The Essential Physics of Medical Imaging, Second Edition, Dec. 15, 2001.

Attwood, the Table of Contents of Soft X-Rays and Extreme Ultraviolet Radiation, Principles and Applications, Mar. 5, 2007.

Karlsson, U.S. Appl. No. 12/081,235, filed Apr. 11, 2008.

Office Action mailed Jun. 19, 2009 in U.S. Appl. No. 12/081,235; Inventor: Karlsson.

Notice of Allowance mailed in U.S. Appl. No. 12/081,235; Inventor: Karlsson.

International Search Report mailed Jul. 22, 2009 in European Application No. 09156639.8-2208 corresponding to U.S. Appl. No. 12/081,235.

Cederström, et al., *Generalized prism-array lenses for hard X-rays*, J. Synchrotron Rad., vol. 12, No. 3, May 2005, pp. 340-344, XP-002537854.

Jark et al., *Focusing X-rays with simple arrays of prism-like structures*, J. Synchrotron Rad., vol. 11, 2004, pp. 248-253, XP002537855.

Fredenberg et al., *Prism-array lenses for energy filtering in medical X-ray imaging*, vol. 6510, 2007, pp. 65100S-2-65100S-12, XP040237087.

Ribbing et al., *Microfabrication of saw-tooth refractive X-ray lenses in low-Z materials*, Journal of Micromechanics & Microengineering, vol. 13, No. 5, Sep. 1, 2003, pp. 714-720, XP020068983.

Stein et al., Fabrication of silicon kinoform lenses for hard X-ray focusing by electron beam lithography and deep reactive ion etching, Journal of Vacuum Science and Technology: Part B, vol. 26, No. 1, Jan. 4, 2008, pp. 122-127, XP012114059.

* cited by examiner

SYSTEM AND METHOD FOR IMAGING USING RADIO-LABELED SUBSTANCES, ESPECIALLY SUITABLE FOR STUDYING OF BIOLOGICAL PROCESSES

CROSS-REFERENCE TO RELATED APPLICATION

This application claims priority from U.S. Provisional Application No. 60/861,980, filed Dec. 1, 2006. The entire content of that application is hereby incorporated by reference.

TECHNICAL BACKGROUND

Molecular imaging using radio-labeled agents is gaining popularity and is used both with humans and for laboratory animals, in research and in clinical praxis. The basic principle is that a substance of interest, such as an antibody is labeled with a radiographic tracer. In principle the substance can thus be traced in the body in real time by detecting the decay of the tracer. For an overview of the field see for example: J. Bushberg et al. "The Essential Physics of Medical Imaging", Second Edition, page 587-736 including references therein and in T. Budinger et al. "Imaging Transgenic Animals", Annu. Rev. Biomed. Eng. 1999 01, p 611-648 or M. King et al. "Introduction to the physics of molecular imaging with radioactive tracers in small animals, Journal of Cellular Biochemistry Supplement 39 (2002) p. 221-230.

Basically molecular imaging can be used to solve a host of experimental problems that emerge from contemporary biomedical research. Among the areas of greatest promise are the study of small animal models of human diseases, characterizing gene expression and phenotype changes arising from genetic manipulations and maybe most of all applications in drug discovery and development. For further details see J. Fowler et al., "PET and drug research and development", Journal of Nuclear Medicine 1999: 40(7):1154-1163 and S. Gambihr et al. "Imaging adenoviral-directed reporter gene expression in living animals with positron emission tomography", Proc of the National Academy of Sciences 1999: 96 p 2333-2338.

One variation of molecular imaging, so called Single Photon Emission Computed Tomography (SPECT), uses a radio-active nuclide emitting x-rays or gamma rays. Common tracers are Technetium (99m) at 140 keV but also tracers like Iodine (125) emitting at lower energies around 30 keV are used. This method is further described in H. Barret and K. Myers "Foundations of Image Science" p 1153-1234. In F. Beekman et al. "U-SPECT-I: A Novel System for Submillimeter-Resolution Tomography with Radiolabeled Molecules in Mice Journal of Nuclear Medicine" Vol. 46 No. 7 1194-1200 an assembly of multiple pinholes for SPECT is outlined.

Another variation of molecular imaging is so called Positron Emission Tomography (PET) where a radioactive nuclei is emitting a positron which, after traveling a short distance annihilate and the resulting 511 keV radiation is emitted back-to-back from the annihilation. The distance the positron travels before annihilation is limiting the spatial resolution. Applications of PET is further described in e.g. B. Solomon et al. "Applications of Positron Emission Tomography in the Development of Molecular Targeted Cancer Therapeutics", Biodrugs 2003, 17(5) page 339-354, by A. Shukla et al. "Positron emission tomography: An overview", 2006: 31 (1), Page : 13-21 or W. Moses "Trends in PET imaging", Nuclear Instruments and Methods in Physics Research A 2001 (471) p 209-214.

It is common practice that the nuclear image is merged with a standard 3D CT transmission image in order to obtain the functional and the structural information in one image and thus being able to locate the functional information more accurately in the body, see e.g. G. Kastis et al. "Compact CT/SPECT Small Animal Imaging System, Trans Nucl Sci 2004; 51: 63-71.

A major challenge with these methods is to achieve sufficient statistics, i.e., a large enough number of counts to limit the statistical noise in a voxel in the image in a reasonable image acquisition time. Normally, an image with minimum image acquisition time, low noise and high spatial resolution is desirable, and these requirements conflict with each other since shorter image acquisition time means less statistics (more noise) and high spatial resolution requires low noise. In today's state-of-the art SPECT equipment, a collimator, pinhole or so called coded aperture is required to obtain the required spatial resolution. The collimators and pin-holes all have the drawback of very low geometrical acceptance of incident radiation which leads to a decreased number of detected photons and increased noise. The higher spatial resolution required, the further away the pin-hole needs to be from the object, the lower the geometrical acceptance, and the higher the noise. Some of the trade-offs with pinhole imaging are outlined further by S. Metzler et al., "Analytic Determination of Pinhole Collimator Sensitivity with Penetration".

One way to solve the problem would be to increase the number of injected tracer molecules. However, this number is limited for several practical reasons and because the maximum radiation dose to the object needs to be minimized. Secondly, in the case of single photon emission imaging a collimator, made of an x-ray absorbing material is used to obtain position resolution and this collimator is very inefficient with a transmission often less than 1:1000. Alternatively different pinhole geometries can be used and/or coded apertures but in all cases the transmission efficiency is very low and there is a strong built in trade-off between the spatial resolution and the efficiency. This is e.g. discussed by S. Meikle et al., "CoALA-SPECT: a coded aperture laboratory animal SPECT system for preclinical imaging", IEEE Nuclear Science Symposium Conference Record, 10-16 Nov. 2002 (2), p. 1061-1065.

One way to mitigate the problem is outlined in U.S. Pat. No. 6,949,748 where the x-rays emitted from the object are focused by means of grazing-incidence optics. These mirrors are bulky and difficult and expensive to manufacture which makes them hard to use in real applications. The mirrors are also hard to align. Moreover the mirrors cannot be positioned next to each other in such a way that they cover a substantial area without leaving a significant amount of dead area between the mirrors.

SUMMARY

The technology in this case overcomes these and other drawbacks of the prior art arrangements. The collimators/pinholes/coded apertures/grazing incidence optics are exchanged with in-line x-ray optics arranged in combination with an X-ray detector to detect radiation from radio-labeled substances within an object to be imaged. This arrangement provides a nuclear imaging device with potentially orders of magnitude higher resolution and efficiency that is relatively easy to align and to produce and assemble in large quantities. The technology will also likely in some applications enable

DETAILED DESCRIPTION

Figure 1:
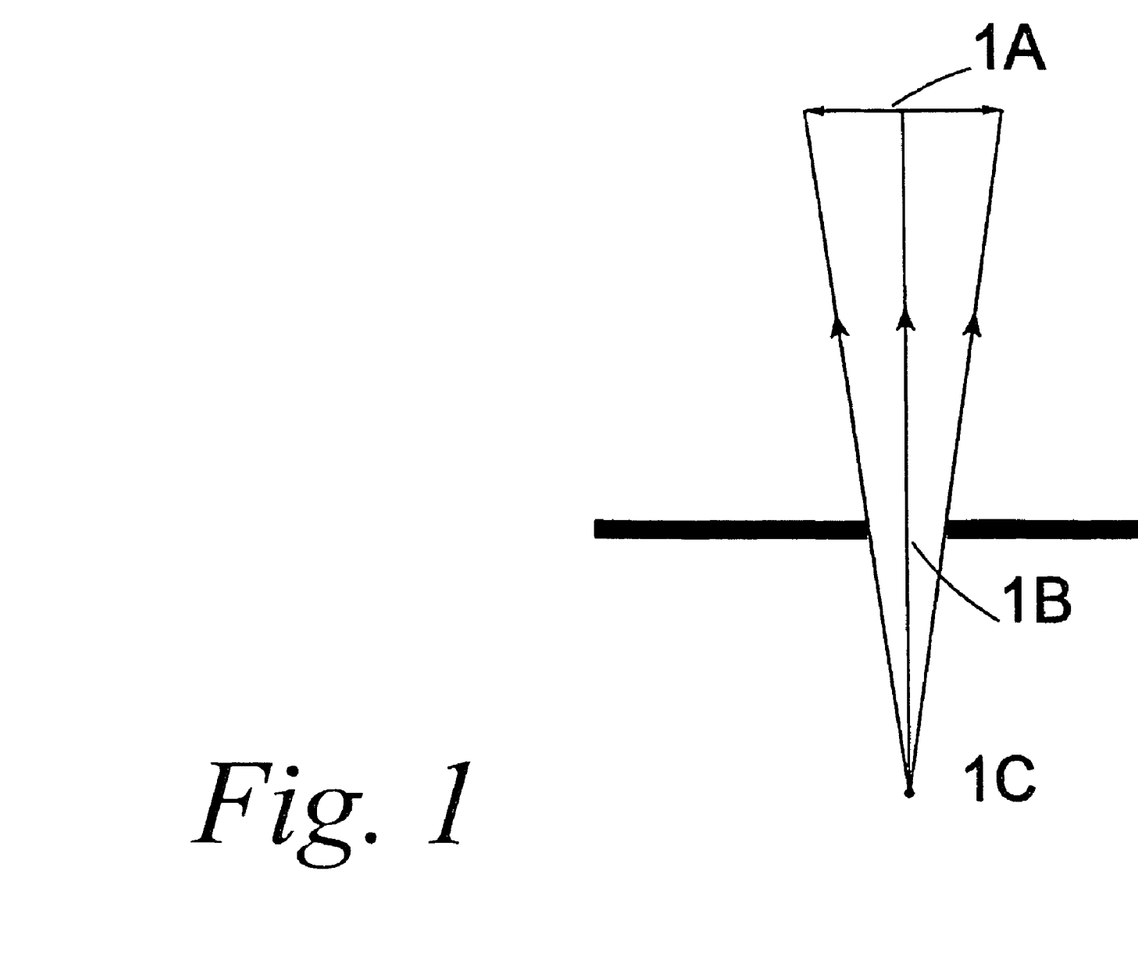
FIG. 1 is a schematic diagram illustrating the unavoidable blurring of a pinhole camera.
Figure 2:
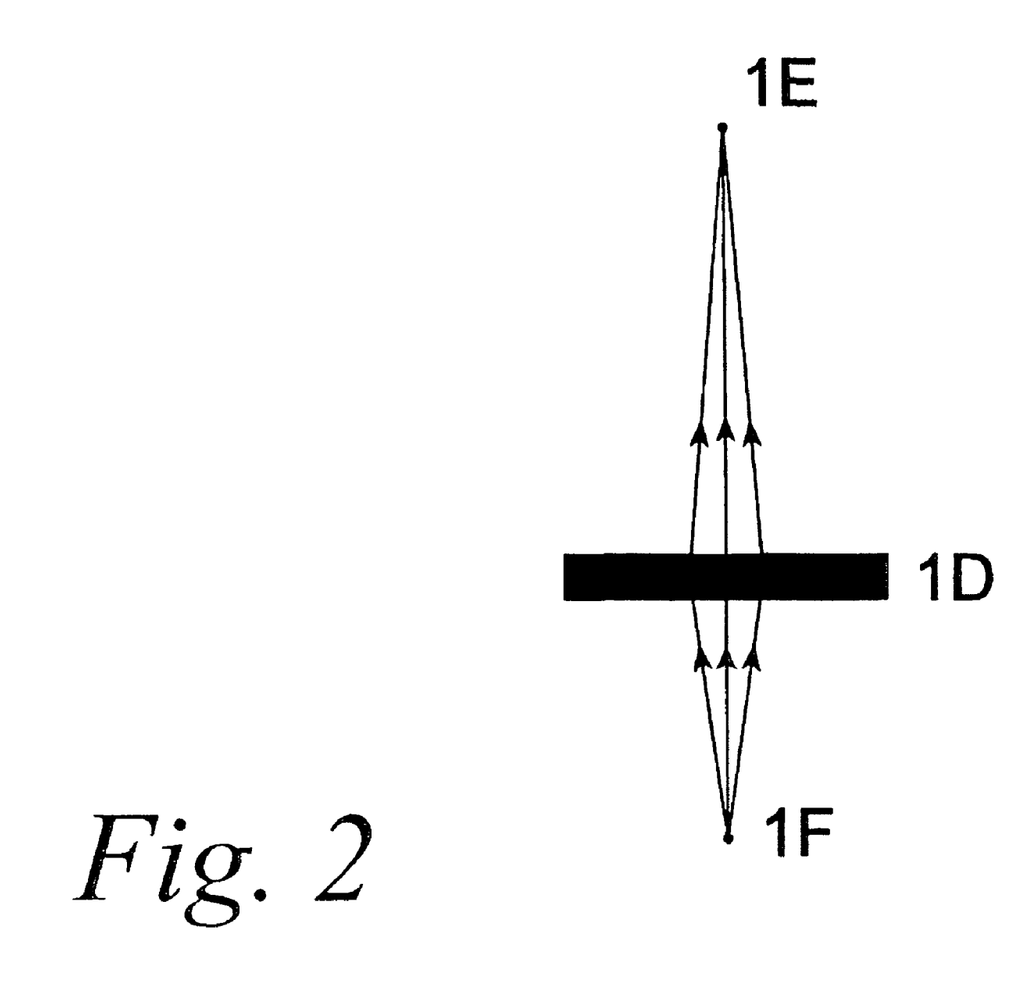
FIG. 2 is a schematic diagram illustrating imaging of a point-like object using an X-ray lens.

The technology described offers a solution to the challenges in state-of-the-art technology for molecular imaging with radio-labeled tracers which may enable a dramatic increase in spatial resolution and/or detection efficiency. By introducing in-line X-ray optics properly arranged in connection with a suitable X-ray detector, the spatial resolution can be improved while keeping or improving the efficiency in detecting emitted x-rays from the tracer. The difference in limitations in spatial resolution is depicted in FIG. 1 where the unavoidable blurring with the pinhole camera is indicated as 1A and the pinhole is indicated as 1B and a point object as 1C. This should be compared to the corresponding set-up in FIG. 2 with an X-ray lens (1D) with an image (1E) of a point like object (1F).

Figure 3:
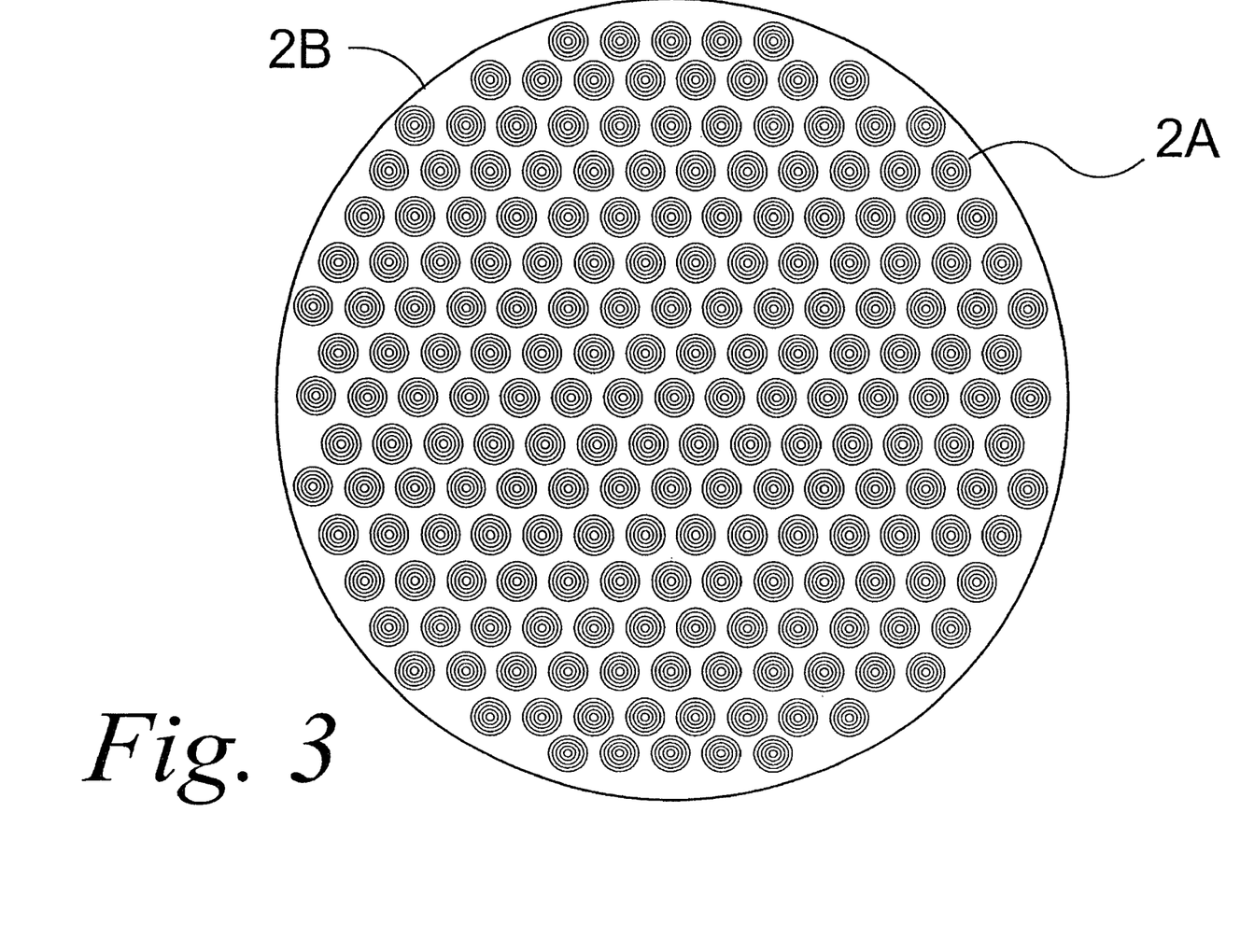
FIG. 3 is a schematic diagram illustrating a wafer with many lenses.
Figure 4:
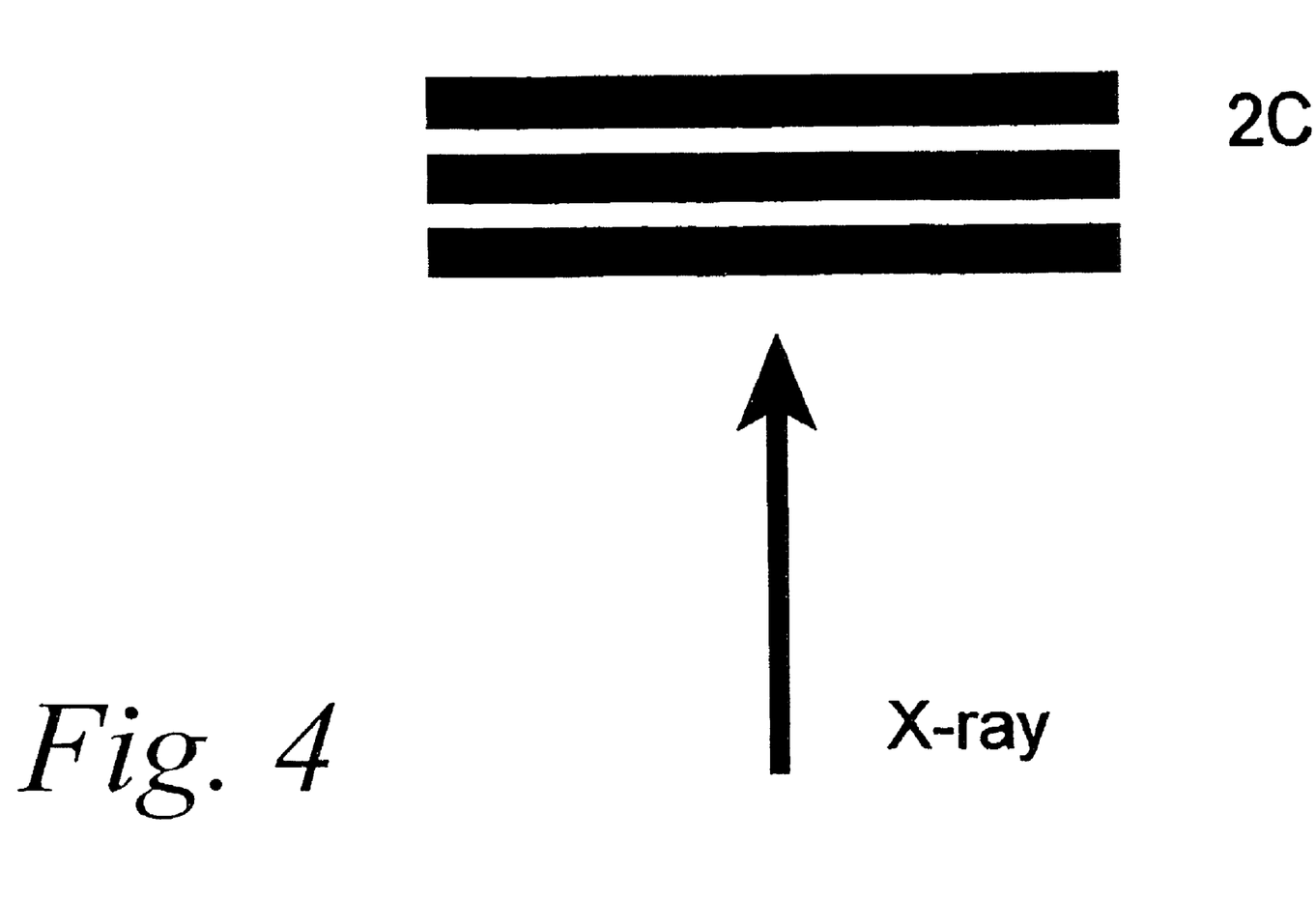
FIG. 4 is a schematic diagram illustrating several wafers stacked to make up a lens arrangement.

The in-line optics does not deflect the central ray as opposed to off-line optics such as mirrors. Suitable in-line optics can be constructed by using micro-machining techniques. In-line optics for X-ray energies above 5 keV can be constructed. These devices are so called in-line optics and the x-ray beam is passing through the lens. The in-line optics is usually easier to align, makes it easier to fulfill mechanical constraints and can be manufactured in processes similar to what has been developed for the semiconductor industry. As illustrated in FIG. 3, many lenses (2A) can be manufactured on a "wafer" (2B) through etching or through electron beams. FIG. 4 illustrates several wafers with lenses stacked to make up a lens arrangement (2C) if a three dimensional structure larger than what is easily produced on one wafer is required. For possible fabrication techniques see for example S. Cambell "The Science and Engineering of Microelectronic Fabrication", Oxford University Press, Second edition 2001.

An example of such x-ray optics is the phase contrast lens. The principle for this lens is to block the part of light that is out of phase for a certain focal distance. Another, and more efficient, method is to phase-shift the material that is out of phase. These lenses are e.g. described in D. Attwood, "Soft X-rays and Extreme Ultraviolet Radiation", Cambridge University Press 2002, page 337-394 and references therein. With current technology it is feasible to make a zone plate that works for energies up to 20 keV.

Another example is refractive optics as described e.g. in U.S. Pat. No. 6,668,040, "Refractive X-ray arrangement" or lenses described in B. Lengeler et al. "A microscope for hard x rays based on parabolic compound refractive lenses", Applied Physics Letters 1999: 74(26), p. 3924-3926. In principle these lenses work at least up to 150 keV.

A third example is the x-ray optics outlined in United States Patent Application 20060256919 B. Cederstrom, Nov. 16, 2006. In principle these lenses work at least up to 150 keV.

All the in-line optics can be built to work also only in one dimension, something which may be a choice in some applications. A one-dimensional lens is sometimes easier to manufacture but will in general result in a lower image quality compared to a two dimensional lens.

Collimators made of material with high x-ray absorbing efficiency may be positioned between the object and the detector in order to absorb x-rays that would otherwise blur the image.

The in-line optics may thus for example be formed by parallel array lenses or made up by zone plates. The detector may for example include a Charge Coupled Device with or without a Scintillator for x-ray conversion, or a double-sided silicon strip detector with coincidence electronics to deduce the position, or a semi-conductor based pixel detector.

Figure 5:
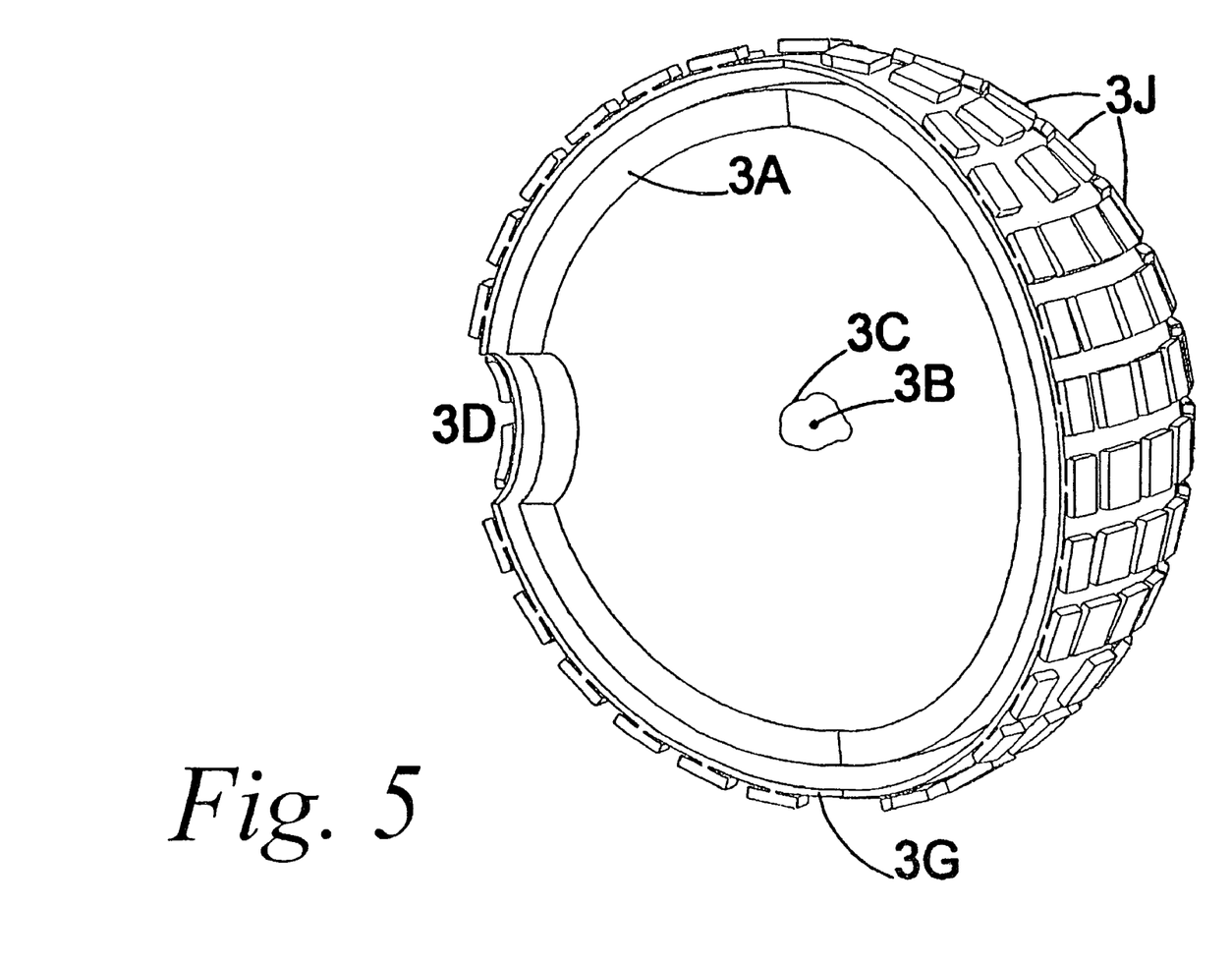
FIG. 5 is a schematic diagram illustrating an imaging system according to an example embodiment.
Figure 6:
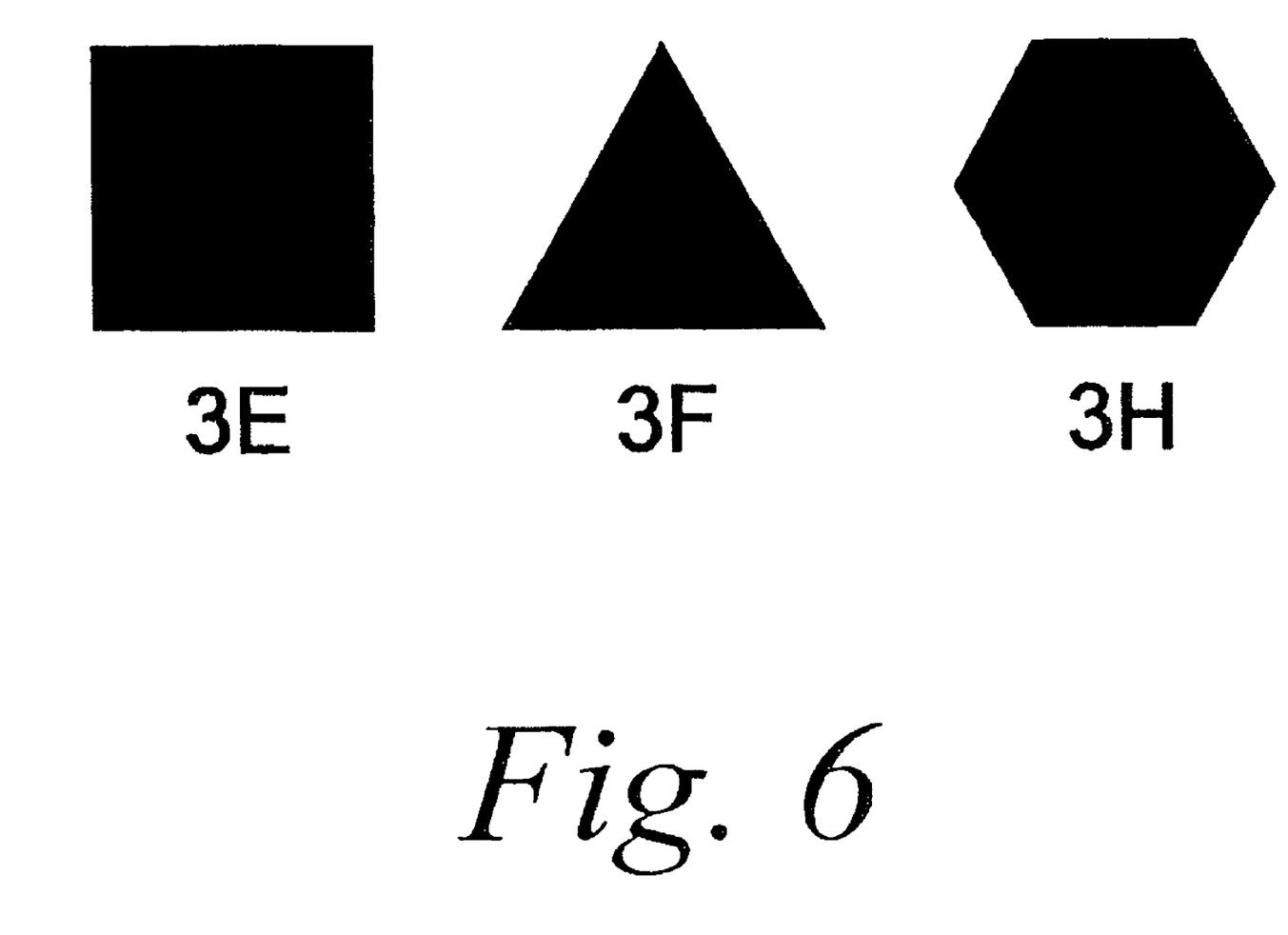
FIG. 6 is a schematic diagram illustrating different forms of lens pieces that can be used to build up a spherical arrangement of x-ray optics.

In an example embodiment, illustrated in FIG. 5, the X-ray optics is positioned in a spherical symmetry (3A) focusing on a point (3B) where the object is positioned (3C). The object may consist of biological substance or the brain of a laboratory animal or human being. An opening (3D) in the sphere has to be provided in order to position the object. Since the lenses will likely be delivered on flat and not curved substrates the sphere will in reality preferably be built up from a number of flat pieces. As illustrated in FIG. 6, these pieces may for example have forms such as square (3E), triangular (3F), Hexagonal (3H) or other more irregular forms. The size and the forms of the pieces should be optimized in order to be easy to produce and handle (not too small) and in order to cover the whole field with a minimum of dead area in between. This will change the shape of the sphere since it will be built up of tiles of flat surfaces. Outside the X-ray optics, one or more X-ray detectors (3G) will be positioned to cover as much as possible of the area outside the X-ray optics. This means that the overall X-ray detector is normally built up of a number of smaller X-ray detectors or detecting units. The opening 3D is also required in the detector sphere in order to position the object. The shape of the X-ray detector(s) will typically be similar to that of the X-ray optics (3E,3F,3H). The X-ray detector must have enough thickness to stop the X-rays and may, if desired, be covered by a scintillating material to increase the efficiency. The detectors with associated electronics to read out the data could be Charge Coupled Devices (CCDS), double sided strip detectors as described in G. Batignani et al. "Double-sided silicon strip detectors in Pisa", Nuclear Instruments and Methods in Physics Research A (1995) 360 p 98-102, pixel detectors with attached Application Specific Integrated Circuits (ASICs) as described in M. Chmeissani et al. "First Experimental Tests with a CdTe Photon Counting Pixel Detector Hybridized with a Medipix2 Readout Chip", IEEE Trans. Nucl. Sci. (2004) vol. 51, NO. 5. If required the detectors may be stacked on top of each other to increase the stopping power for the X-rays or the x-rays may be incident edge-on to the detector as is described in U.S. Pat. No. 4,937,453 to achieve increased stopping power. The detectors will typically be positioned as close as possible to the image plane of the X-ray optics and the focal X-ray optics will be designed in such a way that as far as possible there are no ambiguities for X-rays traversing adjacent X-ray lenses, such an ambiguity could arise if an X-ray hitting the detector could come from more than one lens.

The detectors and related electronics (3J) may also be configured for determining the energy of the emitted X-ray to provide energy-discriminating detection. This enables to cut noise in form of scattered x-rays since these x-rays lost energy in the scattering process. It also enables tracking of several radiolabels simultaneously if the different nuclides are used for the labeling that emits at different energies. Thus several biological processes can be studied at the same time. This will put a constraint on the X-ray optics used to work for all the different energies of interest in order for this feature to work.

Figure 9:
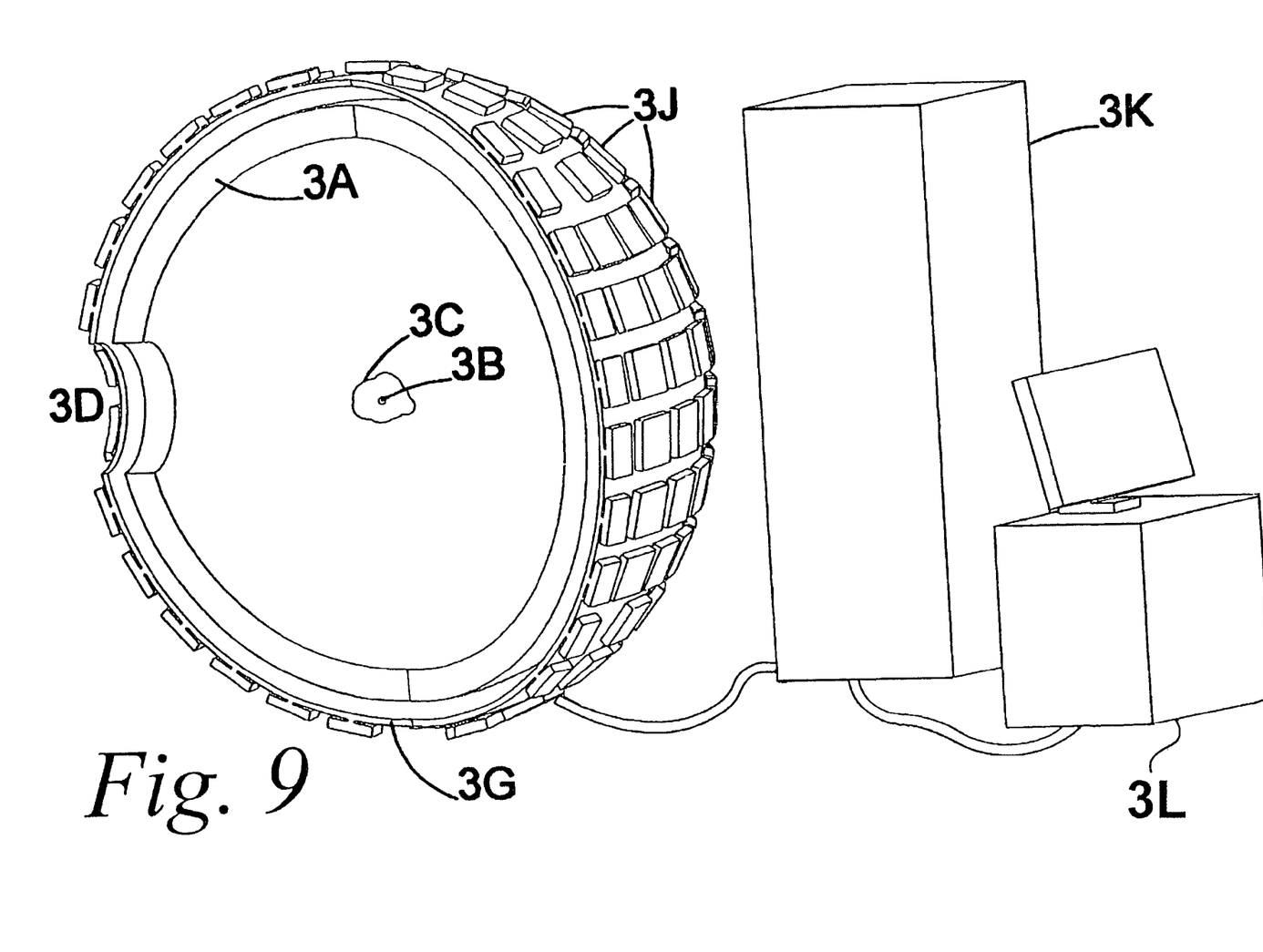
FIG. 9 is a schematic diagram illustrating an imaging system with an associated data acquisition system according to an example embodiment.

The front-end electronics (J) will be positioned as close as possible to the detectors to minimize any noise. As illustrated in FIG. 9, a data acquisition system will be required to collect and transfer the data to a storage media (3K) for further processing in a computer or dedicated digital electronics (3L) to reconstruct the resulting three-dimensional image.

Figure 7:
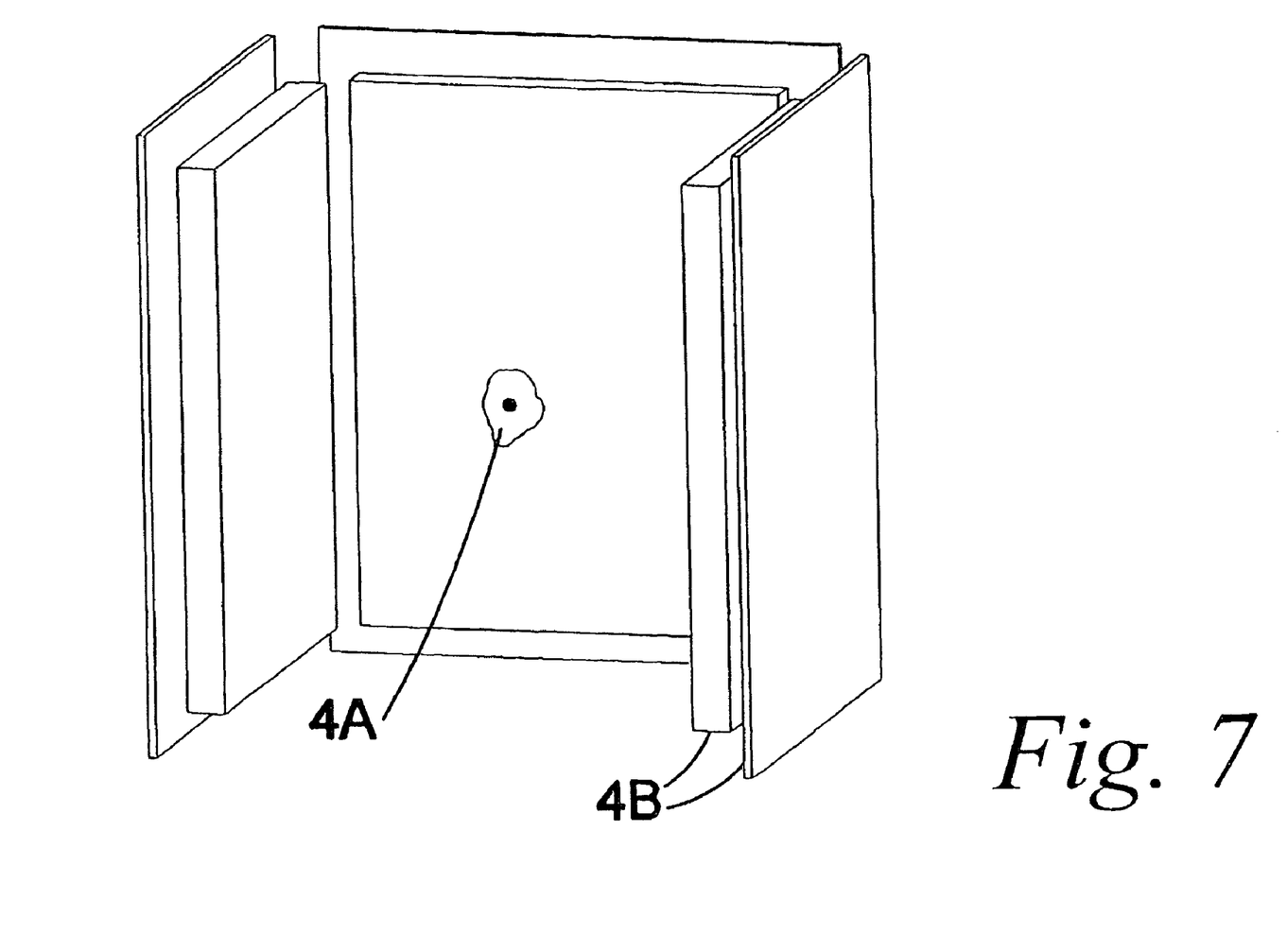
FIG. 7 is a schematic diagram illustrating an imaging system based on rectangular pieces of x-ray optics and detectors according to an example embodiment.

In another exemplary embodiment, illustrated in FIG. 7, the object (4A) is put in rectangular arrangement or box with sides of x-ray lenses and this arrangement or box in turn put inside of a larger rectangular arrangement or box constituted by the x-ray detectors. In a variation of this embodiment up to all but one of the sides (4B) may be omitted and the remaining structure may scan the object if a motion of the object such as rotation is provided of the object relative to the x-ray lenses and detectors. Also the sides in the box may not extend all the way to the corners since this area would not contribute to the image of the object. Compared to the first embodiment this embodiment will be less efficient but the advantages are that it will be easier and cheaper to produce since it involves less components and is easier to assemble.

Figure 8:
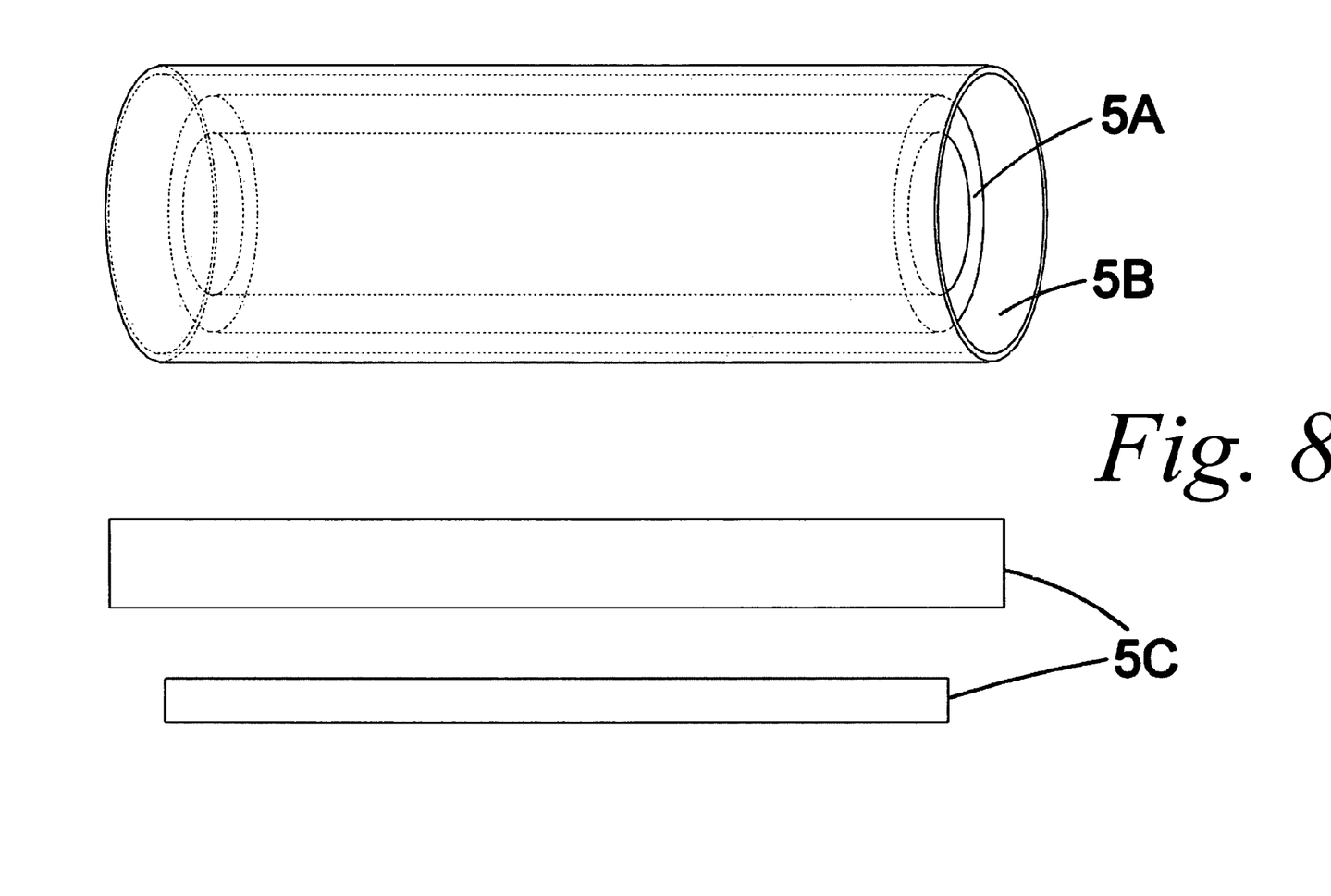
FIG. 8 is a schematic diagram illustrating an imaging system based on x-ray optics and detectors in a cylindrical arrangement according to an example embodiment.

In yet another exemplary embodiment, illustrated in FIG. 8, when a whole elongated object is to be imaged, such as the whole body of a human being or laboratory mouse is to make a cylinder of X-ray optics (5A) arranged or encapsulated in a cylinder of X-ray detectors (5B). Preferably, the cylinders will be built from rectangular pieces (5C).

In all embodiments one may employ mechanical motions in terms of rotation and/or translation of the X-ray lenses and detectors in order to avoid any sampling artifacts and to maximize spatial resolution and image quality in the area of interest.

The system may for example be adapted for molecular imaging based on Single Photon Emission Computed Tomography (SPECT).

The technology described is generally applicable to address problems that emerge from contemporary biomedical research such as the study of small animal models of human diseases, characterizing gene expression and phenotype changes arising from genetic manipulations and applications in drug discovery and drug development.

The embodiments described above are merely given as examples are not limiting. Further modifications, changes and improvements which retain the basic underlying principles disclosed and claimed herein are within the scope of the invention.

The invention claimed is:

1. A system for three-dimensional imaging of an object prepared with radio-labeled substances, wherein said system comprises in-line x-ray optics arranged in combination with an X-ray detector to detect ionizing radiation from said radio-labeled substances, wherein said in-line x-ray optics are built from a number of flat pieces of lenses, each one of said flat pieces of lenses including a plurality of lenses manufactured side-by-side on a wafer, each lens comprising a plurality of prisms, wherein several wafers are stacked to form a lens arrangement, and wherein said x-ray detector includes a number of x-ray detecting units arranged to cover an area of an image plane of the in-line x-ray optics, and wherein said in-line x-ray optics are arranged for focusing on a position where the object is to be placed and said x-ray detector is positioned sufficiently close to or at an image plane of said x-ray optics in order to map ionizing radiation from said radio-labeled substances onto said x-ray detector for three-dimensional imaging of said object, and said in-line x-ray optics is designed such that an x-ray hitting the detector will not come from more than one lens.

2. A system according to claim 1, further comprising means for rotation and/or translation of the detector and x-ray optics relative to the object to be imaged in order to simplify image reconstruction and maximize image quality.

3. A system according to claim 1, wherein said x-ray optics is made of zone-plates.

4. A system according to claim 1, wherein said x-ray optics is refractive.

5. A system according to claim 1, wherein said x-ray optics comprises parallel array lenses.

6. A system according to claim 1, wherein said detector comprises a Charge Coupled Device with or without a Scintillator for x-ray conversion.

7. A system according to claim 1, wherein said detector is a double-sided silicon strip detector with coincidence electronics to deduce the position.

8. A system according to claim 1, wherein said detector is a semi-conductor based pixel detector.

9. A system according to claim 1, wherein said detector is an energy discriminating detector for identifying a multitude of different radiotracers emitting radiation at different energies and each radiotracer labeling a different substance.

10. A system according to claim 1, further comprising image processing means for converting data registered by said detector into a useful image.

11. A system according to claim 1, wherein said system is adapted for imaging a living object.

12. A system according to claim 1, wherein said system is adapted for molecular imaging based on Single Photon Emission Computed Tomography (SPECT).

13. A system according to claim 1, wherein said in-line x-ray optics is arranged in a spherical symmetry focusing on a point where the object is to be positioned.

14. A system according to claim 13, wherein said in-line x-ray optics is built up of tiles of flat lens surfaces.

15. A system according to claim 13, wherein at least one X-ray detector is arranged to substantially cover the x-ray optics.

16. A system of claim 15, wherein an opening is arranged in the spherical symmetry to enable positioning of the object to be imaged.

17. A system of claim 1, wherein a rectangular arrangement with sides of x-ray lenses is arranged inside of a rectangular arrangement of sides of X-ray detectors.

18. A system of claim 1, wherein a cylinder of x-ray optics is arranged in a cylinder of X-ray detectors.

19. A system according to claim 1, wherein said in-line x-ray optics are built from a number of flat pieces of lenses arranged to cover substantially the whole field with a minimum of dead area in between, and one or more x-ray detectors will be positioned outside of the x-ray optics to cover as much as possible of the area outside the x-ray optics.

20. A system according to claim 1, wherein said in-line focal x-ray optics are provided in the form of x-ray lenses and designed in such a way that there are substantially no ambiguities for x-rays emitted from said radio-labeled substances and traversing adjacent x-ray lenses and that an x-ray hitting said x-ray detector will not come from more than one lens.

21. A method for three-dimensional imaging of an object using radio-labeled substances, wherein said method comprises using in-line x-ray optics arranged in combination with an X-ray detector to detect ionizing radiation from said radio-labeled substances, wherein said in-line x-ray optics are built from a number of flat pieces of lenses, each one of said flat pieces of lenses including a plurality of lenses manufactured side-by-side on a wafer, each lens comprising a plurality of prisms, wherein several wafers are stacked to form a lens arrangement, and wherein said x-ray detector includes a number of x-ray detecting units arranged to cover an area of an image plane of the in-line x-ray optics, and wherein said in-line x-ray optics is arranged for focusing on a position where the object is to be placed and said x-ray detector is positioned close to or at an image plane of said x-ray optics in order to map ionizing radiation from said radio-labeled substances onto said x-ray detector for three-dimensional imaging of said object, and said in-line x-ray optics is designed such that an x-ray hitting the detector will not come from more than one lens.

22. A method of manufacturing an imaging system for three-dimensional imaging of an object, wherein said method comprises the steps of providing in-line x-ray optics and arranging an X-ray detector relative to said x-ray optics to detect ionizing radiation from radio-labeled substances in said object to be imaged, wherein said in-line x-ray optics are built from a number of flat pieces of lenses, each one of said flat pieces of lenses including a plurality of lenses manufactured side-by-side on a wafer, each lens comprising a plurality of prisms, wherein several wafers are stacked, and wherein said x-ray detector includes a number of x-ray detecting units arranged to cover an area of an image plane of the in-line x-ray optics, and wherein said in-line x-ray optics is arranged for focusing on a position where the object is to be placed and said x-ray detector is positioned close to or at an image plane of said x-ray optics in order to map ionizing radiation from said radio-labeled substances onto said x-ray detector for three-dimensional imaging of said object, and said in-line x-ray optics is designed such that an x-ray hitting the detector will not come from more than one lens.

23. A method of manufacturing according to claim 22, wherein said in-line x-ray optics is arranged in a spherical symmetry focusing on a point where the object is to be positioned.

24. A method of manufacturing according to claim 23, wherein said in-line x-ray optics is built up of tiles of flat lens surfaces.

25. A method of manufacturing according to claim 23, wherein a number of X-ray detecting units are arranged to substantially cover the spherical X-ray optics.

26. A method of manufacturing according to claim 22, wherein said in-line x-ray optics is built as a cylinder, and substantially encapsulated in a cylinder of X-ray detectors.

27. A method of manufacturing according to claim 22, wherein a rectangular arrangement with sides of x-ray lenses is arranged inside of a rectangular arrangement of sides of X-ray detectors.

* * * * *